Feb. 6, 1968
R. M. PAGE
3,368,189
OBSTACLE LOCATOR SYSTEM
Filed June 12, 1951
5 Sheets—Sheet 1
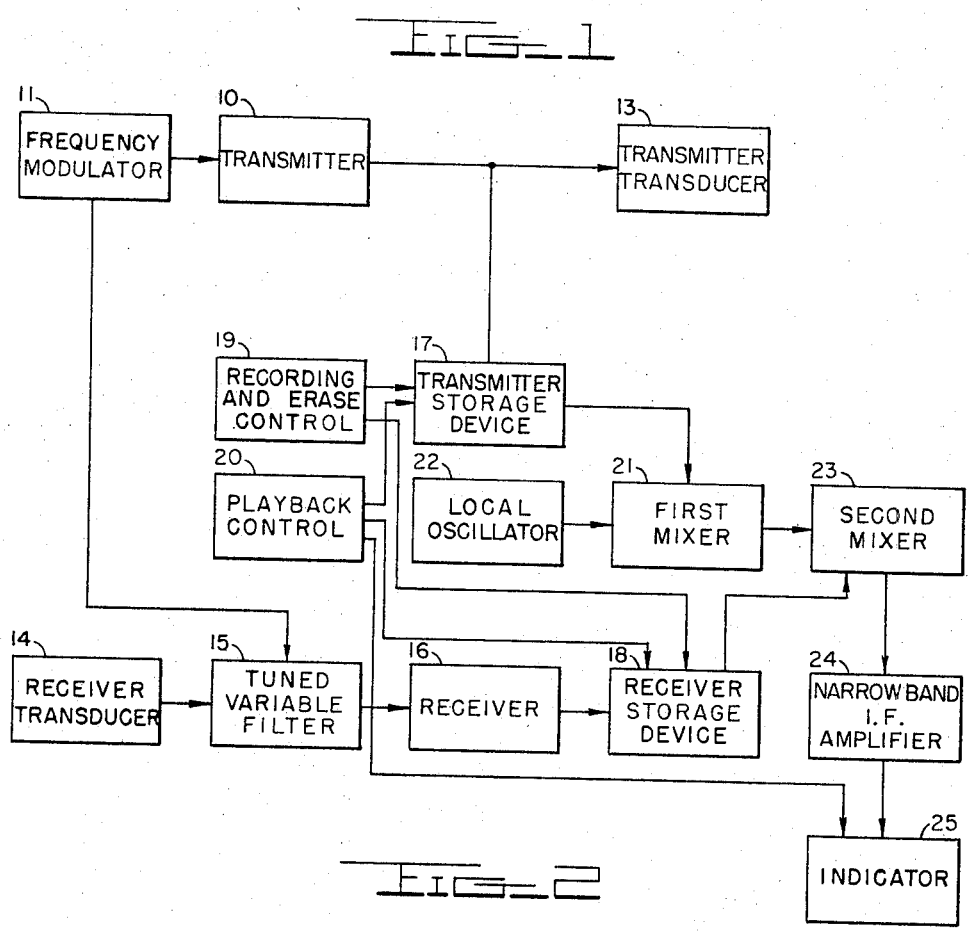
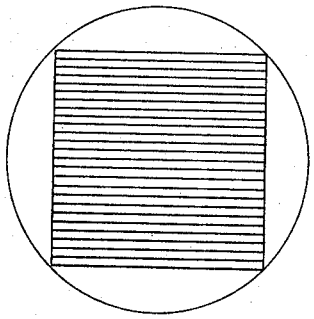
INVENTOR
ROBERT M. PAGE
BY
ATTORNEYS

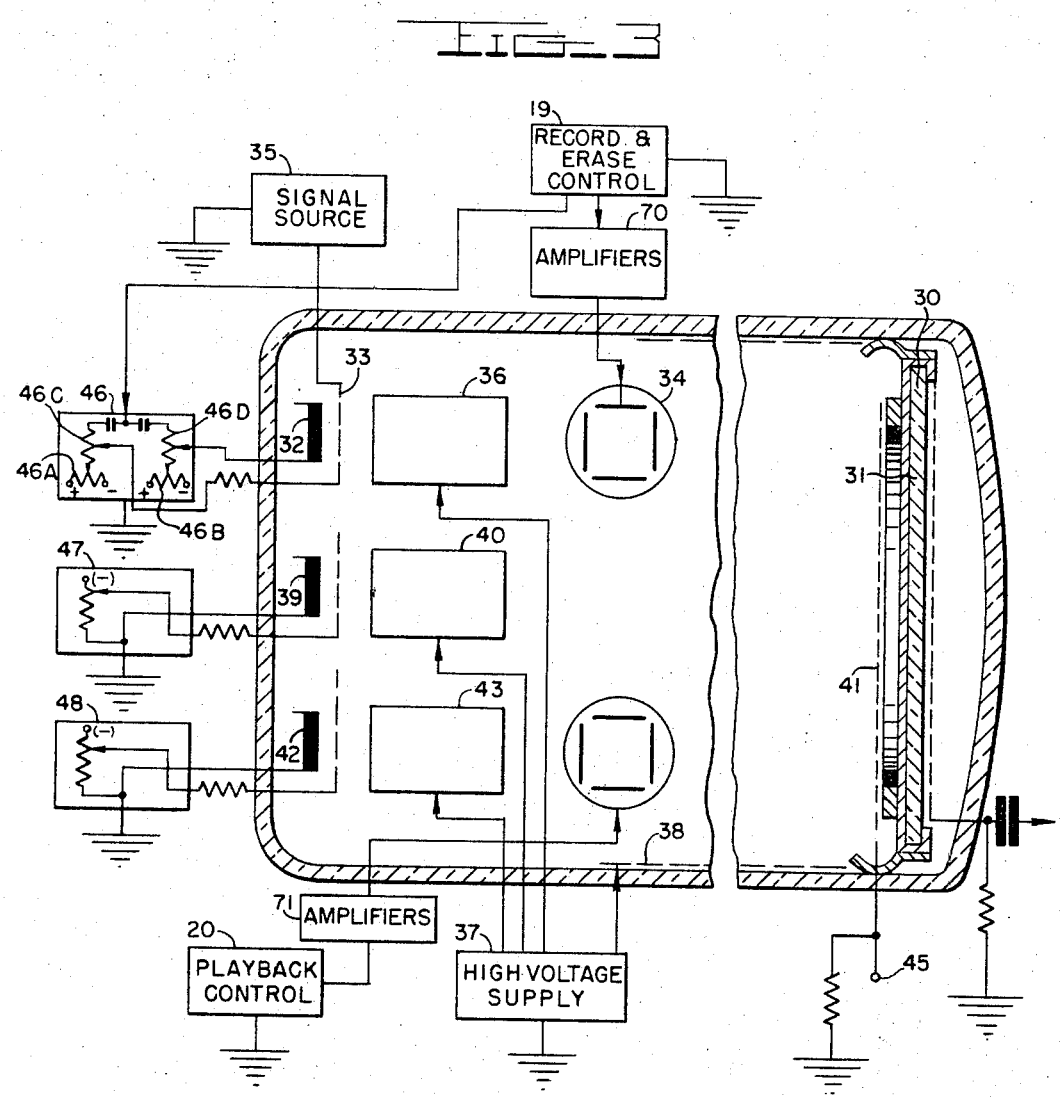

INVENTOR
ROBERT M. PAGE

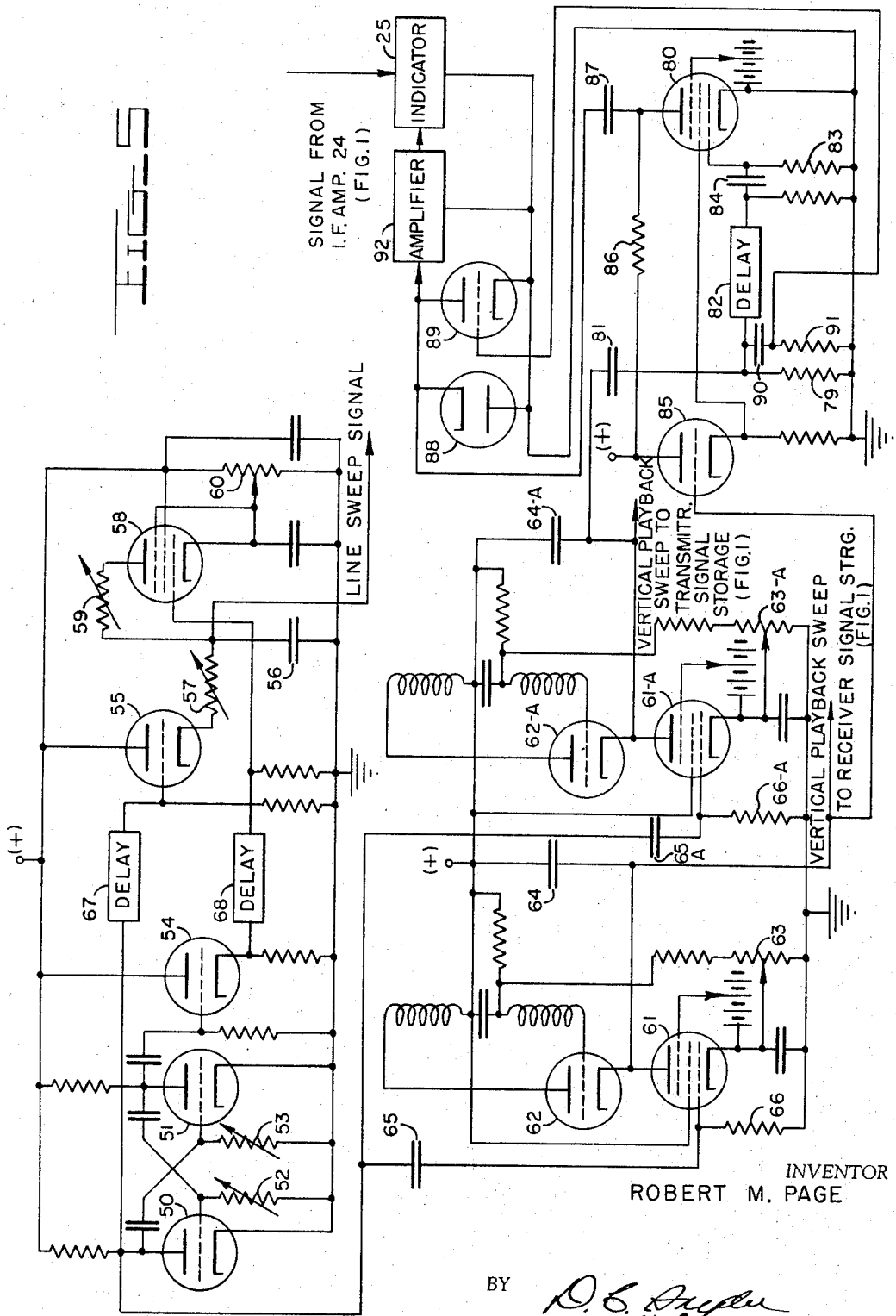

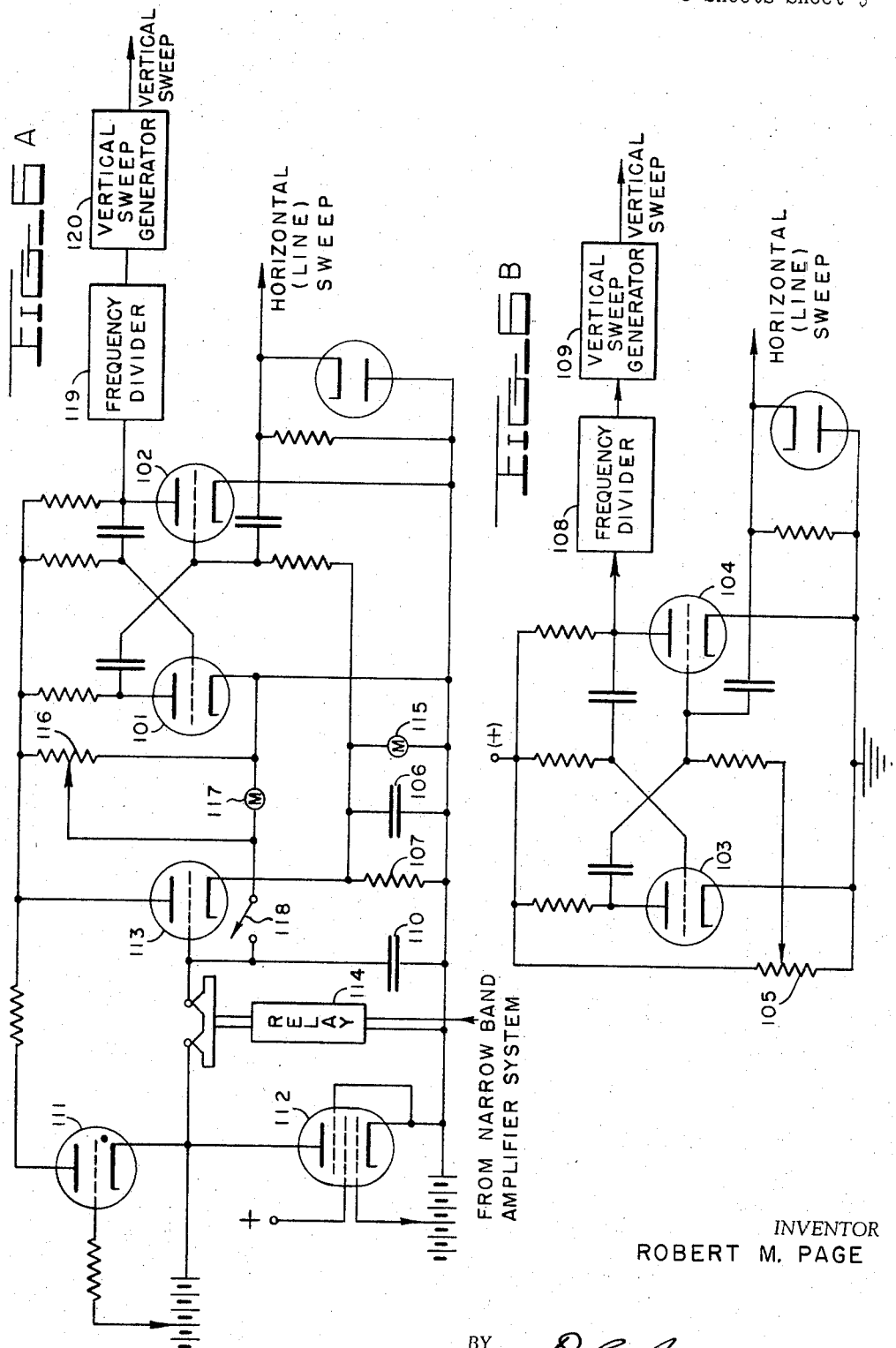

United States Patent Office 3,368,189
Patented Feb. 6, 1968

3,368,189
OBSTACLE LOCATOR SYSTEM
Robert M. Page, Camp Springs, Md., assignor to the United States of America as represented by the Chief of Naval Research
Filed June 12, 1951, Ser. No. 231,244
5 Claims. (Cl. 340—3)

The invention described herein may be manufactured and used by or for the Government of the United States of America for governmental purposes without the payment of any royalties thereon or therefore.

This invention relates to an echo energy operative object locator system in general and in particular to locator systems employing sonic or ultra-sonic energy, such systems being useful for the detection of movable objects.

Locator systems employing sonic or ultra-sonic energy are subject to certain inherent limitations which by their meer character restrict the maximum range of operation, the speed with which information may be obtained, and the reliability of the information when it is obtained. The primary limitation is that imposed by the velocity of propagation of the sonic or ultra-sonic energy which is usually listed in terms of feet per second rather than as miles per second as with radio frequency energy. Where the velocity of propagation of energy is low, pulsed systems must operate at a very low pulse repetition frequency to allow sufficient time for the two-way travel of energy between the locality of the energy emitting source and the maximum usable range of operation. In the operation of locating moving objects when the locator system itself is also subject to motion it is therefore apparent that considerable range change can easily take place between successive pulses so that the average range error can become quite high even for close range. It is always desirable to improve the average accuracy of locator systems as well as to extend the range of operation thereof, hence from the requirements just mentioned it appears that the two desirables are directly conflicting.

It is accordingly an object of the present invention to provide a method of improving the average accuracy of locator systems of the sonic or ultra-sonic energy type.

Another object of the present invention is to provide a method of increasing the operating range of locator systems of the sonic or ultra-sonic type.

Other and further objects and features of the present invention will become apparent from a consideration of the accompanying description and drawings in which:

FIG. 1 is a block diagram of a locator system constructed in accordance with the principles of the present invention;

FIG. 2 is a representation of the signal storage scheme employed in the present invention;

FIG. 3 shows a storage tube suitable for use in the apparatus of the present invention;

FIGS. 4 and 5 show details of typical control circuits employed in signal retention and reproduction of FIG. 1; and FIGS. 6a and 6b show circuitry useful in compensating for Doppler frequency shift in the return echo signals.

Figure 4:
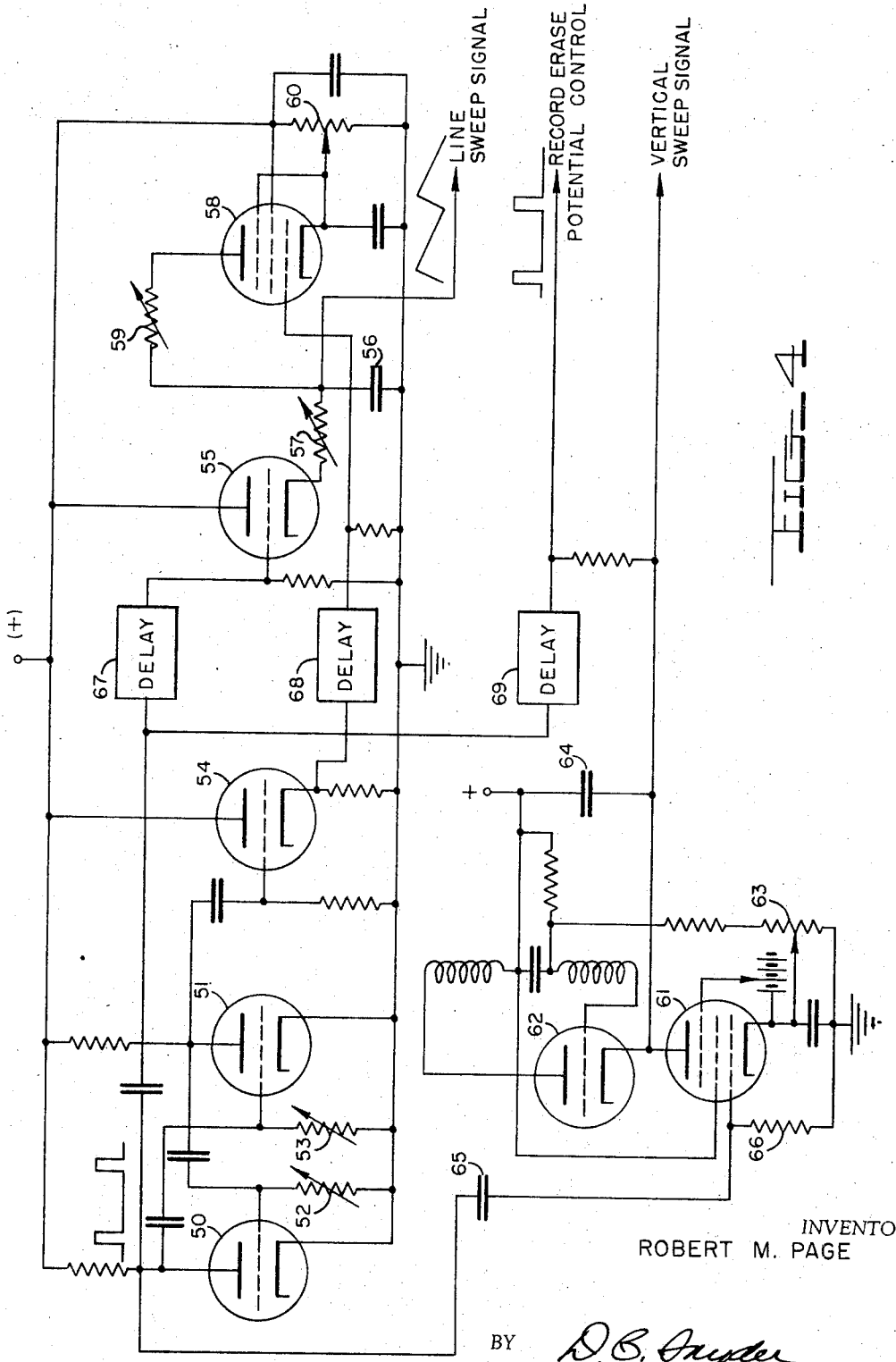

In accordance with the principles of the present invention, an echo energy operative object locator system is provided which has features suited for improved operation particularly with sonic, supersonic or other forms of energy characterized by a low propagational velocity.

The improvement is provided by new signal handling techniques and new combinations of apparatus giving signal integration wherein signals from one selected range are reinforced over a period of time by in-phase addition of uniform signals while signals from other ranges are not in phase and hence are not reinforced. Signal integration is thus employed and with it the entire range interval may be covered over a period of time by sweeping the selected range over the entire range interval.

In this new system, energy is emitted continuously from a suitable form of emitter or signal emission transducer. The energy as generated is provided with frequency modulation. Echo energy returned by reflection is picked up by a receiving transducer and applied to a receiver amplification system. Advantage is taken of the frequency modulation to provide protection for the receiver so that it will not be saturated by direct reception of the continuously emitted energy. This protection is provided by a narrow band rejection filter circuit variable tuned so that the rejection frequency tracks the instantaneous frequency variations of the emitted signal. Thus the emitted signal may be greatly attenuated or effectively blocked at the input to the receiver. Such a filter does not provide complete receiver protection without some rejection of desired signals, however the signal loss is small. At any rate the time instants wherein the rejection filter frequency coincides with the frequency of desired received signals are very brief and infrequent, and may in some cases be reduced to zero by Doppler shifts in received reflected energy from objects moving relative to the apparatus. Long range operation is made possible because of the continuous emission of energy delivering considerable average power to energy reflective objects and permitting narrow bandwidth receiver amplifier circuits. Integration of received energy over a period of time provides additional range operation while the frequency modulation provides the means of obtaining range resolution.

Both emitted and received signals are recorded preferably on an energy storage means for playback in subsequent analysis. In the playback operation, stored emitted and received signals are combined to obtain beat signals. These beat signals are at a constant frequency only when the playback emitted signals are delayed with respect to the playback received signals from a selected range by an amount equal to the time delay in energy transmission and thus provide for range determination. With such timing the playback received signals are brought into coincidence with the emitted signals producing them so that a low frequency beat signal of practically a constant frequency is obtainable despite the frequency modulation.

The frequency value of this constant frequency is influenced by Doppler shift due to target range rate. In operation, the stored records are scanned for all Doppler frequencies as well as for all ranges, thus requiring a double scan, one of which would normally be much faster than the other.

With reference now to the block diagram of FIG. 1, the apparatus indicated therein comprises a number of components which individually are of more or less conventional design.

Energy of the frequency which it is desired to emit is generated by the transmitter 10. Transmitter 10 is any suitable form of continuous wave source such as a high power oscillator or a low power oscillator-power amplifier combination suitable to produce the desired amount of emitted power. The output from transmitter 10 is of a substantially continuous nature when the system is in operation, however the energy is frequency modulated under the control of a frequency modulator 11. Where the system is intended for underwater sound operation (Sonar) a typical transmitter output frequency could be 200 cycles per second while the modulation frequency is 2 cycles per second, the total carrier frequency deviation under modulation being approximately 20 cycles per second.

Energy generated by the transmitter 10 is applied to the transmitter transducer 13 for emission thereby. Any suitable form of energy transducer may be employed, the only requirement being that it be capable of transferring the energy from transmitter 10 to some medium in which the location operation is to be conducted. Typically in the Sonar application the medium would be sea water. The transducer 13 will in general have directional characteristics suitable to give bearing as well as range however in certain situations an omnidirectional transducer may give more rapid determination of the range of an energy reflective object, after which is determined the bearing of the object by means of a transducer having directional characteristics. Since the directional transducer is in general the more useful type, the balance of the discussion will be primarily concerned with that type element, for which some form of positioning means is ordinarily provided to control the orientation of the axis of major directivity thereof. No specific indication of such positioning means is made in FIG. 1, it being understood that where such is employed it could be a component of the transducer block 13.

Energy thus emitted travels away from the transducer 13. When such emitted energy encounters an energy reflective object a portion thereof is returned thereby to the locality of the transmitter where it is intercepted by the receiver transducer 14 and applied through a filter 15 to the receiver 16. Like the transmitter transducer 13, the receiver transducer 14 may possess directional or omnidirectional characteristics, however if both transducers 13 and 14 are directional and positionable, it is desirable that they be mechanically linked together so that their positioning is synchronized to such an extent that they are both always pointing in the same direction. Again the positioning devices for this transducer may be included within the block of the transducer 14 and may be linked to the positioning devices for transducer 13, by suitable conventional means not shown in FIG. 1.

Since the transmitter 10 is substantially continuously operative to provide continuously emitted energy, some sort of protection for the receiver 16 must be provided to prevent overloading of the receiver by the strong emitted signals. Such protection is afforded by the tuned variable filter 15 inserted between the receiver transducer 14 and the receiver 16. The filter 15 is a tunable, variable frequency device, possessing a narrow rejection bandwidth which is automatically varied in frequency to track the transmitter frequency as it is modulated, so that the instantaneous transmitter frequency signal is rejected in the signal path to receiver 16. Such a filter 15 can be of very simple nature being for example either a parallel or a series resonant circuit appropriately connected. As an example of a way in which the tracking may be accomplished, the frequency modulation which is at a low rate can be introduced by a variable mechanically driven capacitance within the modulator 11 operative to control the frequency of the transmitter 10 which is also connected to the variable capacitance in the resonant circuit of the filter 15. By virtue of such connection, tracking of the rejection frequency and the transmitter frequency can easily be assured.

In accordance with the teaching of the present invention both the generated transmitter signals and the receiver output signals resultant thereto are recorded for subsequent analysis. The transmitter signals are recorded in storage device 17 while the receiver signals are recorded in storage device 18. These storage devices 17 and 18 are of any suitable nature providing the frequency response, dynamic range, and retention time desired. Signal storage techniques are now quite well known and storage devices capable of operating satisfactorily for the purpose of the present invention are available. Such storage can generally be handled directly at the frequency of the transmitter 10 however in some instances, it may be desirable to record at a lower frequency. Such a lower frequency is readily obtained by providing an oscillator and mixer within each of the storage blocks 17 and 18 or a single oscillator for both storage blocks and a separate mixer in each operating from the oscillator. By means of such auxiliary equipment the signal is reduced in frequency for easier handling yet the information content is not reduced.

In many instances it is possible to employ such a simple storage medium as magnetic tape. In other instances with higher transmitter frequencies, the additional cost and complexity of an electronic storage system with storage cathode ray tubes employing a mosaic may be justifiable particularly in view of the tremendous flexibility inherent in an electronic system as compared to a partly mechanical system. Because of this, the block diagram of FIG. 1 is drawn with particular attention to details involved in the electronic storage system.

Signal storage and playback controls 19 and 20 for electronic storage mosaic are merely sweep signal generators of general types related to those employed in conventional oscillograph sweep circuits, however they are highly stable circuits precisely adjusted for cooperative action with simultaneous recording of transmitted and received signals and simultaneous playback of stored transmitter signals and stored receiver signals wherein during successive playback operations the time relationship between received signals and transmitted signals is altered to enable a coverage of all time delays of received signals with respect to transmitted signals so that signal correspondence for all ranges desired is readily obtainable.

In electronic signal storage, the signals are stored as electron concentration variations on a storage plate or mosaic mounted within an evacuated envelope which plate is acted upon by an electron beam. The electron beam is deflected in two mutually perpendicular planes to cover a rectangular area on the storage plate while the beam is intensity modulated with a signal to be stored to provide the electron concentration variations. By means of the deflection signals, transmitted or received signals are stored in a series of lines placed adjacent to each other very much as the familiar television raster. Where signals are continuous, a continuous Erase-Record-Playback cycle must take place; however of necessity there is a momentary break in the signal each time the flyback from one signal storage line to the next occurs. Such a momentary break has little effect on the circuit operation because its duration can be held to a very small percentage of the duration of each storage line. Thus signals are stored as they occur with the oldest signals being erased just prior to the storage of new signals.

The signal retention period, that is, the duration of time that a stored signal portion is retained before it is erased to make way for storage of a newer signal portion is not a critical duration; however in general it is desirable that this period be somewhat longer than the total integration time of the system. Typically this period could have a duration of several minutes.

To explain the process of signal storage and playback in better detail, attention is directed to FIG. 2 which shows a simplified picturization of signals as they would be retained in the storage devices 17 and 18. FIG. 2 is a very elementary showing of only a few horizontal lines on a frame appearing as on the circular face of a cathode ray tube. It should be understood however that electronic storage devices do not necessarily provide an indication wherein actual signal variations are visible, signal storage ordinarily being in the form of electron concentration variations rather than as variations of visible light.

The storage represented by FIG. 2 is practically continuous and by example, time may be considered as progressing down and to the right, similar to television raster timing but of course without interlacing. Thus for example signal storage will start at the upper left, will proceed horizontally on the first (upper) line until the end of the line at which time a rapid flyback to the left to the start of the second line occurs. This continues until the end of the bottom line (lower right hand corner) at which time flyback to the upper left hand corner takes place to repeat the sequence. This action continues maintaining almost a continuous record of the signals with the exception of the portions required for the flyback, which periods can normally be a very small percentage of the actual time.

Signals thus recorded must be removed as time passes to make way for new signals to be stored. Such a removal process may be termed "erasure" and in practice can be accomplished a line at a time just prior to the recording of each line. This erasure can be performed in many ways, for example, the same electron beam which is employed for recording may be used for erasure on a time sharing basis with the erasure and recording taking place on separate sequential forward (left-to-right) sweeps or the erasure on the flyback portions between successive forward weeps. Practically no recording time is lost when erasure is performed during flyback time; however when erasure takes place during a separate forward sweep produced by the recording and erase control circuit 19, additional time is consumed. This additional time loss will approach 50% if both erase and record forward sweeps take place at the same rate. Such a high percentage of lost time is of course undesirable because it represents lost signal reception time. Such loss can be avoided through time sharing between four storage devices, two for received signals and two for transmitted signals, one of each erasing while the other is recording, if such additional complexity is warranted.

All of the storage devices of the apparatus can employ the same record and erase sweep signals and in fact in many instances it is preferable that they be supplied with the same sweep signals to maintain exact relationship between the transmitter and receiver signals. With the deflection of sweep signals thus providing for signal storage and erasure, the signals to be stored are introduced as intensity modulation of the electron beams.

Transmitter and receiver signals thus stored under control of the circuit in block 19 are utilized by playing them back simultaneously in a continuous sequence under control of the circuit in block 20, and by mixing reproduced transmitted and receiver signals to obtain uniform frequency beat signals. Signal playback takes place very much as the recording, previously described, that is, the stored signals are scanned line by line, progressing with time to the right and down. Several important considerations must remain. One consideration is that the playback sweeping rate ordinarily must be many times as fast as the record sweeping rate. Another consideration is that in playback, the transmitter signal must be delayed by an amount of time equal to the amount of time the received signals is delayed in transmission to and from the distant energy reflective object because it is only when the frequency modulations of the playback received signals are in coincidence with the modulations of the playback transmitted signal that a constant beat frequency signal is maintained. Such coincidence can normally be easily obtained by proper timing of the playback of the stored transmitter signals with respect to the stored receiver signals. The coincidence thus required is obtainable only when the reflective object is located at the proper range as determined by the playback relationship. At any other range, the beat frequency between the playback receiver and transmitter signals will not be the desired value. Such required relationship effectively provides a high degree of range resolution which is desirable but it also requires that some sort of range "search" operation be performed to cover, when desired, all ranges.

This range search may be accomplished by varying the relationship between the playback transmitter signals and the playback receiver signals so that in the course of a selected period of time, coincidence may be realized between transmitted signals and received signals resultant thereto having delay introduced by propagation to and from any range up to the maximum range of operation.

In one form of playback operation which may be considered exemplary, direct delay of playback signals is not employed. Rather the relationship of the playback signals with regard to their relationship as recorded is varied. As a result of this playback operation, frequency modulations on received signals from any range may be brought into coincidence with the frequency modulations of the transmitted signals producing them. To obtain such coincidence to search all ranges, repeated playback of the stored signals becomes necessary with a progressively varying playback delay to cover all desirable transit time (range) delays.

Such a playback scheme may be explained in more detail with the assistance of FIG. 2 which as previously mentioned shows stored signals. As an example only, the total time interval represented by the 26 horizontal lines is somewhat greater than the transit time of signal energy to and from the maximum range of operation. In further exemplary detail it may be assumed that the usable range resolution increment is represented by the duration of one horizontal line. It must be emphasized that such examples of 26 line storage and one line range resolution would not usually be met in practice, more practical values would be 500 lines with resolution of the order of a fraction of a line. Anyway, considering the 26—1 example, the signals are continuously recorded in separate storage devices, each as shown in FIG. 1, and in time correspondence since identical record sweeping signals are employed.

The playback cycle, although it is practically continuous may be considered as starting with the playback of the stored transmitter and receiver signals in the exact time occurrence as recorded. This is obtained by starting the playback of the transmitter and receiver signals simultaneously at the beginning of the first line of each and continuing with transmitter line 1 and receiver line 1 reproduced together, transmitter line 2 and receiver line 2 together, etc. This operation corresponds to a search at zero range and is therefore ordinarily of little value. Following this sweep operation with line to line correspondence a second playback sweep operation is undertaken wherein the transmitter line 1 is reproduced coincidentally with the receiver line 2, transmitter line 2 coincidentally with receiver line 3, etc. This would correspond to search in the first or nearest range increment. Such procedure is continued until all combinations of transmitter and receiver signals are covered at which time a return to the original condition takes place.

Reproduced receiver and transmitter signals are combined to produce beat frequency signals having a narrow bandwidth due to their relatively long duration. These beat signals are integrated in a narrow bandwidth circuit to improve the signal to noise ratio and then utilized in any suitable indicating device which can indicate to an operator the presence of integrated signals.

The playback receiver and transmitter signals must receive certain frequency alteration to insure the production of usable beat signals. The frequency alteration required is dependent upon the record and playback sweep frequencies. In the apparatus combination exemplified by FIG. 1, both transmitter signals and receiver signals are recorded at the same frequency and both transmitter and receiver signals are reproduced at the same frequency, however the reproduction frequency is different from the recording frequency. Thus it is apparent that in this system arrangement, there is no frequency difference between playback transmitter and receiver signals when the range increment is properly adjusted so that a zero beat condition ensues which is necessarily of limited value.

To circumvent such a situation, either the playback transmitter or receiver signals may be altered in frequency before mixing with the other. Such an arrangement is shown in FIG. 1 wherein playback transmitter signals as obtained from the transmitter storage device 17 are applied to a first mixer 21 wherein they are altered in frequency by an amount dependent upon the operational frequency of a local oscillator 22 before being mixed in second mixer 23 with the playback receiver signals from receiver storage device 18. Thus instead of obtaining zero beat signals in the output of mixer 23, beat signals at the frequency of oscillator 22 will be obtained for integration in the narrow bandwidth intermediate frequency amplifier 24 and subsequent indication at 25 such as by a frequency meter or the like.

Another method of obtaining the desired intermediate frequency signal is somewhat more subtle than that described and makes use of principles originally disclosed in my copending application Ser. No. 114,450, filed Sept. 7, 1949, entitled "Radar System," now Patent No. 3,289,201. In this method the local oscillator 22 is rendered inoperative and first mixer 21 is employed as an amplifier. A transmitter signal line playback rate is then employed which is different from the line playback rate for receiver signal playback, so that signals once recorded at the same frequency are reproduced at a different frequency. Mixing of the resultant output signals in mixer 23 provides desired beat frequency signals.

Reference is now made to FIG. 3 which shows partly in schematic form, an electronic signal storage device of a type suitable for use in the present application. This particular storage device was originally disclosed in a copending application of A. V. Haeff Ser. No. 768,790, filed Oct. 15, 1947, entitled "Method of Storing, Maintaining and Reproducing Electrical Signals and Means Therefor," now Patent No. 2,813,998.

This storage tube has an insulator plate 30 with an active surface 31 placed thereon. Typically the plate may be of glass and the active surface distributed will emit particles.

An initial charge distribution pattern representative of the signal to be stored may be placed on the active surface 31 by an electron gun including the cathode 32. The beam energy of this gun may be controlled by grid 33 and deflection means 34 under intensity control of signals to be stored as supplied from signal source 35. Source 35, in the case of storage device 17 of FIG. 1, may correspond to the transmitter 10. The electron beam is focused by a conventional lens electrode system shown diagrammatically at 36 for which is provided a suitable high voltage supply 37. The main tube anode 38, coated on the interior of the envelope, is also energized by supply 37, which is of any type suitable for this purpose.

Signals placed on the active surface 31 are maintained thereon for a long time if desired by delivering a load beam of low velocity electrons thereto from an electron gun including the cathode 39 and focusing lens system 40.

Screen 41 possessing close spacing such as 200 mesh per inch collects secondary electrons emitted from the active surface 31 upon bombardment by playback scanning electrons from a playback electron gun, including cathode 42 and focusing lens system 43. This playback scan is deflected under control of the playback control circuit 20. Output signals produced from the secondary emission current to screen 41 are obtained at terminal 45 and represent the output signals from the storage device.

Signals stored as concentration variations of electrons on the surface 31 may be altered at will (or erased) by adjusting the balance between primary electrons delivered to the surface 31 from cathode 32 and secondary electrons leaving it. Thus by proper alteration of the voltages existing on the tube, stored signals may be "erased" when desired. In actual operation of the tube there is a critical voltage condition (between the cathode and screen) for optimum recording, as well as another critical voltage between cathode and screen for optimum erasing. In the erasing operation the effectiveness or rapidity with which complete erasing may be accomplished depends upon the beam current hence a higher beam current than that employed for recording will in general provide more effective erasure.

With the particular tube structure shown it is possible to achieve line by line erasure with the electron beam from either cathode 32 or cathode 42 however in the particular application with the apparatus of the present invention it is generally preferable to employ the beam from cathode 32, normally considered the record beam, for erasure also.

For erasure the screen potential is ordinarily left unchanged while the cathode 32 potential is shifted to provide the critical erasing voltage between cathode and screen. Simultaneously the grid bias is reduced to increase the beam current for greater erasing effectiveness. As a general proposition, the potential difference between cathode and screen is less for erasure than for recording.

The requirements for erasure in this apparatus are such as to present little difficulty. Appropriate connections are made in the circuit of FIGS. 1 and 3 between the recording and erase control 19 and the storage devices 17 and 18 to adjust the potentials of the Record-playback electron gun (cathode 32 and grid 33) to recording potentials during the recording and to erasing potentials during the erasing operation.

Beam intensity control for the three electron beams of the storage tubes of FIG. 3 is provided by the three biasing devices shown within the blocks 46, 47, and 48. Since the beams from the cathodes 39 and 42 require merely intensity control and once set, remain substantially constant, these beams are provided only with a means for adjusting the negative biasing voltage applied to the grids. The control for the record-erase originating at the cathode 32 is somewhat more complicated because it must provide cathode and grid potential variations required. To this end the control 46 includes potentiometers 46–A and 46–B which provide variations in the D-C potentials of the grid 33 and cathode 32, respectively, and potentiometers 46–C and 46–D which control the amplitude of variational signals applied to the grid 33 and cathode 32 from the record and erase control 19, such variational signals having one level during the "recording" periods and another level during the erase periods.

FIG. 4 shows a basic control circuit suitable for use as the record-erase control 19. This circuit provides both vertical and horizontal beam deflection or sweep signals as well as record-erase control signals as required of the recording and erase control 19 in accordance with the previous discussion. This circuit is intended for the type of overall operation wherein erasure of old information is performed during the return or flyback portion of the horizontal sweep to avoid time losses in a separate forward erasure sweep.

Timing of the operation of this circuit is provided by the multivibrator of the electron tubes 50–51 which is of the free-running type designed to be very much unbalanced so that the conductive period of one tube (50) is of much greater duration than the conductive period of the other tube 51. Thus very unsymmetrical "square" waves are produced by the tubes 50, 51 wherein a signal with short duration positive pulses is obtained at the anode of tube 50 and another signal with short duration negative pulses is simultaneously obtained at the anode of tube 51. The duration of the short pulses is determined by the duration of the cut-off period of tube 50 as controlled by the grid circuit thereof, variable principally by varying resistor 52, while the spacing of the short pulses is determined by the cut-off period of tube 51, variable principally by varying resistor 53. These timing periods are normally held constant, being set up when the apparatus is initially adjusted to provide a selected forward sweep time (in the periods between pulses) and a selected flyback time (during the pulses themselves).

Tubes 50 and 51 drive the cathode follower type circuits of tubes 54 and 55 in opposition to provide alternate periods of heavy conduction by these tubes. Resultant to the short positive pulse periods at the anode of tube 50 and after a short delay introduced for reasons which will be seen later, tube 55 is brought to a condition of very low plate resistance to permit a charging of capacitance 56 through variable resistance 57. In this period, a rapid charge of capacitance 56 takes place to produce the "flyback" portion of the sweep. As previously mentioned, the duration of the flyback portion is dependent upon the duration of the positive pulses at the anode of tube 50 and may be controlled by adjusting the grid resistor 52. The variable resistor 57 in series with tube 55 is adjusted to obtain a reasonable degree of linearity in this flyback period.

Capacitance 56, thus charged, then begins an immediate discharge through tube 58 in series with resistance 59 which is made variable to assist in the adjustment of the circuit for the production of linear waveforms. To this end, the constant current characteristics of a pentode tube 58 assist in the production of linear waveforms. As a further circuit variation for linearity purposes, the resistance 59 placed in the discharge path of capacitance 56 may be omitted entirely, and provision made for supplying an adjustable voltage to the screen grid or suppressor grid of tube 58 to vary the anode impedance of tube 58, such an interchange being well known in the art. The grid of tube 58 is driven from the anode of tube 51 through the cathode follower tube 54 and thus receives the short duration pulses of a negative polarity separated by long duration positive portions. It is during these long duration portions that tube 58 is made conductive, a condition which may be facilitated by the connection of the cathode of tube 58 to a positive potential obtained at a tap point on potentiometer 60. The net result of the operation of the sweep circuitry thus far described in the production across capacitance 56 of a back to back double sawtooth wave having a rapidly changing portion in one direction which is immediately followed by a portion changing slowly in the opposite direction. This is the form of signal desired for line sweep for the record and erase operations in the storage devices and would ordinarily be applied to the deflection means 34 of FIG. 3 through suitable amplifiers 70 located within the storage device block (17 or 18) of FIG. 1. Additionally the short duration pulse waveform existing at many points in the circuit of FIG. 4 (record and erase control 19) may be applied to the storage devices to provide the necessary electrode potential variations as required for optimum erasure and recording.

In addition to the "line" sweep signals provided it also is necessary to produce "frame" sweep signals so that successive lines may be placed one below the other to provide more storage space than could be given by a single line. Such may be compared to the "frame" or "field" vertical sweeps employed in a television raster.

Frame sweep signals for this form of operation in the erase-record phases have certain specific requirements. In particular with erasure during flyback, it is necessary that the line covered in the flyback (erase) of one sweep coincide with the succeeding forward (record) sweep. This almost dictates a stepwise vertical frame sweep with the vertical step from one line to the next occurring at the conclusion of each line. Such a stepwise sweep can be provided by the circuitry of FIG. 4 such as that associated with the tubes 61 and 62. This circuit was originally described in my U.S. Patent 2,275,460. Briefly described it comprises a biased pentode tube 61 which may be considered normally cut-off by virtue of a high positive potential maintained at its cathode from the potentiometer 63. The anode of tube 61 is connected to B+ through capacitance 64 which is by-passed in a D-C conductive circuit by the anode path of tube 62 connected in an oscillatory circuit. This oscillatory circuit is normally quiescent providing no appreciable resistive loading of capacitance 64 however periodically it becomes momentarily operative to provide a low resistance shunt across capacitance 64 to rapidly dissipate any charge accumulated thereacross as a result of conduction by tube 61. The grid of tube 61 is coupled to the anode of tube 50 through a differentiator circuit such as capacitance 65 and resistance 66.

At the start of a cycle of operation, capacitance 64 may be considered as being discharged so that the cathode and anode of tube 62 are at approximately the same potential (B+). The grid of tube 62 will be much lower in potential by virtue of its connection in a voltage divider circuit so that tube 62 is effectively cut-off.

Each time tube 50 is cut off in its cyclic operation with tube 51, tube 61 is momentarily rendered conductive to partially charge capacitance 64 to increase the potential thereacross. Thus a stepwise voltage change is produced across capacitance 64 as successive cycles of operation of the multivibrator 50–51 take place. This stepwise action continues until capacitance 64 is charged sufficiently so that the cathode of tube 62 is lowered enough with respect to the grid thereof to permit tube 62 to conduct. Oscillatory action of the circuit is then initiated continuing thereafter until capacitance 64 s discharged so that the cathode and anode of tube 62 are again at approximately the same potential (B+) at which time oscillations are terminated.

This action continues providing the recurrent stepwise scanning signals required for the frame (vertical) sweeps. The total number of steps occurring in the waveform can be set in one way by adjustment of the biasing voltage applied to the suppressor grid of tube 61. Such variation alters the plate resistance of tube 61 so that it is more or less effective in determining the amount of charge capacitance 64 receives each time tube 61 is unblocked.

It should be understood that such a one stage "divider" as that of tubes 61, 62 has a definite limitation on the number of "steps" which can be handled. This circuit could normally be expected to handle the 26 steps required for the showing of FIG. 2 however it would in all probability be inadequate for 500 steps. For the larger number of steps, cascaded frequency dividers or other forms of step-wave generators could be employed.

The relative timing of the various signals produced by the circuit of FIG. 4 is of extreme importance and may be insured by the delay devices of blocks 67, 68 and 69. Thus the line sweep signal may be delayed with respect to the vertical sweep signal by adjusting the delay circuits 67 and 68 and the record-erase potential control signals may be delayed by delay circuit 69 so that the signals may be applied to the storage device with the proper relative timing.

Thus the circuit of FIG. 4 has been described as providing the horizontal or line sweeps and the vertical or frame sweeps for a storage device as well as the necessary potentials to alter the storage device from the "record" to the "erase" operations. It is therefore apparent that the entire circuit of FIG. 4 may be employed as the record and erase control 19 of FIG. 1 with "line," "vertical" and "record-erase control" signal outputs.

Exemplification of apparatus 20 of FIG. 1, for producing the horizontal and vertical playback sweep signals for both the transmitter and receiver signals is given by FIG. 5. The apparatus of this figure is quite closely related to that of FIG. 4, like components having the same numbers in both figures. There are several noteworthy differences, however. Primarily the playback sweeps are of necessity much faster than the record sweeps, hence, in the design of the circuits appropriate account must be made of the fact. Additionally, the record-erase potential control signal is not required since it is provided by the circuit of FIG. 4. Thus the delay device 69 is not required in the circuit of FIG. 5.

FIG. 5 includes a single horizontal sweep signal generator having the tubes 55 and 58 controlled by the operation of the multivibrator of tubes 50 and 51. Two stepwise vertical sweep generators, one for the transmitter storage device and one for the receiver storage device, each like the single one of FIG. 4, are included in FIG. 5 both responsive to the signal produced at the anode of tube 50. The two vertical sweep generators are adjusted, for example, by adjusting the suppressor grid potentials of tubes 61 and 61-A so that in operation one vertical sweep generator operates with one more step in its waveform than the other generator. In keeping with the previous discussion therefore, the vertical sweep generator of tubes 62-A and 61-A which provides sweep for playback of stored transmitter signals will be adjusted to operate with 26 steps to continuously sweep the 26 lines of stored transmitter signals. On the other hand the vertical sweep generator of tubes 61 and 62 will be adjusted to provide 25 steps so that in each successive vertical scan of the stored signals, the playback receiver signals will be advanced one horizontal line (one range increment) with respect to the playback transmitter signal to compensate for range delay introduced by signal transit time and thereby provide range search.

FIG. 5 also contains equipment for indicating range of an energy return object. Since the amount of line shift of the receiver signals required to secure correspondence between playback receiver and playback transmitter signals is directly dependent upon range, it is sufficient to measure this line shift to get a good range indication. The line shift may be determined by measuring the differences between the two vertical deflection signals when an output is obtained from the narrow band intermediate frequency amplifier 24 of FIG. 1. Such measurement may be provided for example by the coincidence tube 80 which is connected to determine the value of the receiver vertical sweep at the instant of each flyback of the transmitter vertical sweep. The control grid of tube 80 is connected to the anode of tube 61-A through a first differentiating resistance capacitance circuit 79, 81, through delay device 82, and finally through the coupling circuit of resistance 83 and capacitance 84. With this arrangement, the stepwise sawtooth wavefrom produced at the anode of tube 61-A is first converted into a series of short duration pulses, wherein large amplitude positive pulses are separated by 26 small amplitude negative pulses. This signal is then delayed by a small amount of time sufficient to insure that the delayed positive pulse always occurs after the vertical sweep circuit of tubes 61, 62 reaches equilibrium following receipt thereby of a pulse from the anode of tube 50. The delayed signal coupled through the long time constant results in conduction by the control grid of tube 80 on the circuit 83-84 peaks of the large amplitude positive signals to develop a grid leak biasing voltage across capacitance 84, which effectively holds tube 80 non-conductive between positive pulses. During the positive grid pulses, the degree of conductivity of tube 80 is variable in dependency on the potential of the screen grid of tube 80 which is connected to the receiver vertical sweep circuit of tubes 61 and 62 through an impedance conversion tube 85. With such an arrangement, pulse signals will be produced across the anode resistor 86 of tube 80 in amplitude dependency on the value of the receiver vertical playback signal when the transmitter vertical playback signal flyback occurs. The amplitude of these pulse signals is dependent upon the range being searched at any particular instant and can form the basis for a range measurement by indicator 25 which may be of the cathode ray tube variety. For measurement purposes, a deflection signal is derived in accordance with the amplitude of these pulses and applied to the indicator 25 as a horizontal (time base) deflection signal while the output of the narrow band intermediate frequency amplifier 24 is applied as a vertical deflection signal.

The variable amplitude pulses produced across resistance 86 are converted into a form suitable for deflection through the operation of capacitance 87 and tubes 88 and 89. Tube 88 operates as a clamper tube, charging capacitance 87 to the peak of each pulse during the existence thereof so that following the conclusion of each pulse and until a succeeding pulse occurs, the potential of the cathode of tube 88 will rise to a positive voltage equal to the pulse amplitude. This amplitude increases in steps as the vertical sweep circuits 61, 62, and 61-A, 62-A get further and further out of correspondence until finally they return to correspondence. With the return to correspondence, small amplitude pulses are produced across resistance 86. Capacitance 87 is discharged to follow such variation by tube 89. This tube is connected across tube 88 and is grid driven by the poistive portion of the differentiated signal produced across resistance 79 applied through the coupling circuit of capacitance 90 and resistance 91. Thus in operation, tube 89 is unblocked at the instant of each flyback of the vertical sweep circuit for the transmitter signal to effectively drop the potential of the anode of tube 89 to ground potential. Almost immediately thereafter, however, after the small delay inserted by the delay device 82, a negative pulse is produced across resistance 86. Due to the clamping action of diode 88, however, the potential of the anode of tube 89 does not fall below ground potential but rather causes a change in the charge of capacitance 87. Thereafter, of course, when the negative pulse across resistance 86 terminates, the anode of tube 89 rises to a potential which is positive with respect to ground by an amount approximately equal to the amplitude of the preceeding negative pulse produced across resistance 86. Normally the periods of conduction by tubes 88 and 89 as well as the time spacing between these periods are quite short so that for practically the entire time the potential at the anode of tube 89 is at a voltage level positive with respect to ground by an amount equal to the amplitude of the preceeding pulse produced across resistance 86. This sort of signal is entirely suitable for use by the indicator 25 however an amplifier 92 may be inserted to provide push-pull deflection signals if desired.

The circuits thus far described have no provisions for compensation of Doppler frequency shift in the return signals due to relative motion between the locator systems and energy return objects. As a practical matter compensation for such frequency shift is almost essential because rarely ever is Doppler frequency shift absent. Doppler compensation may be introduced by circuitry of the general character indicated by FIGS. 6-A and 6-B. Again it must be emphasized that these circiuts are exemplary only. The circuit of FIG. 6-A is intended to provide the horizontal (line) and vertical sweep signals for the stored received signals while the circuit of FIG. 6-B is intended to provide the horizontal (line) and vertical sweep signals for the stored transmitter signals. Both circuits have free running multivibrators 101–102 in 6-A and 103–104 in 6-B of very unsymmetrical makeup providing signals at the grid of the second tubes (102 and 104) which are of nearly a "sawtooth" form, suitable for horizontal deflection signals. The frequency of the sawtooth signals as well as their rate of rise is dependent upon the grid return voltage of the second tubes (102 and 104) which is controllable. Horizontal playback sweep signals for the transmitter signals are produced by the apparatus of FIG. 6-B at a constant frequency and rate as determined by the setting of potentiometer 105 whereas the frequency of the horizontal playback sweep signals for the received signals as produced by the apparatus of FIG. 6-A is normally constantly variable brought about by a varying grid return voltage for tube 102 as obtained across capacitance 106 and resistance 107.

In the apparatus of FIG. 6-B the frequency divider 108 is driven from the anode of tube 104 to provide output keying signals at a selected submultiple of the frequency of operation of the circiut of tubes 103-104. Connected to the frequency divider 108 is a vertical sweep generator 109 which is responsive to the reduced frequency signal to produce the vertical sweep signal for playback. In accordance with the discussion of the preceding figures it is generally desirable that a stepwise vertical sweep be employed.

In the apparatus of FIG. 6–A, the varying grid return voltage for tube 102 is brought about through the operation of a sawtooth signal generator circuit including capacitance 110 together with the associated charge tube 111 and discharge tube 112. Charge tube 111 is of the gas (ionic conduction) variety and is normally maintained in a cut-off condition. Whenever the potential across capacitance 110 drops sufficiently, however, the ignition potential of tube 111 is exceeded, tube 111 becomes heavily conductive to rapidly charge capacitance 110 to a potential approaching that of the supply voltage. Thereafter conduction in tube 111 ceases and capacitance 110 begins a slow linear discharge through tube 112 at a rate controllable by the setting of the control grid voltage of tube 112.

Capacitance 110 is connected through a cathode follower circuit including tube 113 to the circuit of capacitance 106 and resistance 107. Thus variations appearing across capacitance 110 are repeated at slightly reduced amplitude across resistance 107 for application as a varying return potential to the grid circuit of tube 102. Capacitance 110 is connected to tubes 111 and 112 through the normally closed contacts of relay 114. Relay 114 is connected to the output of the narrow band intermediate frequency amplifier 24 of FIG. 1 in such a manner that in the presence of an integrated output signal from amplifier 24, relay 114 is operated to disconnect capacitance 110 from the charge and discharge tubes 111 and 112. Capacitance 110 thereafter retains its charge for a suitable length of time to permit the reading of the voltmeter 115 connected across resistance 107. With the reading of meter 115 thus taken, potentiometer 116 is adjusted until the reading of meter 117 corresponds approximately thereto or is slightly lower to provide bias for tube 113. When such adjustment has been made, switch 18 is closed so that tube 113 repeats the voltage tapped from potentiometer 116. Potentiometer 116 is then adjusted until optimum signal output is obtained from amplifier 24 (FIG. 1).

Horizontal sweep signals for playback of the received signals thus being obtained, vertical signals are obtained therefrom in the same manner as in the apparatus of FIG. 6–B. To this end the frequency divider 119 is connected to the anode of tube 102 and the sweep generator 120 is connected to the divider 120.

In playback with the circuits of FIGS. 6–A and 6–B, the previously outlined scheme may be employed wherein the frequency division from horizontal to vertical for playback of received signals is different from that of transmitted signals. If such is the case, the dividers 108 and 119 will be adjusted so that one divider provides a division ratio having a numerical value which is larger by one (1) than the division ratio provided by the other divider. Thus the range search as previously outlined can be carried out.

The preceeding has included a detailed discussion of a system constructed in accordance with the teachings of the present invention as well as illustrations of certain components of the system. From the discussion it is apparent that considerable modification is possible without exceeding the scope of the invention which is defined in the appended claims.

What is claimed is:

1. In a system for detecting objects disposed in an energy propagational medium, transmission means for delivering frequency modulated signals into the medium, reception means for intercepting signals in the medium reflected from objects located in the medium, storage means retaining for a period of time first signals characteristic of the delivered signals and second signals characteristic of the intercepted return signals, playback control means connected to the storage means operative to control the playback of the first and second signals in variable time relationship to secure a selected frequency difference between the played back first signals and the played back second signals for selected range, and a narrow bandwidth intermediate frequency amplifier responsive to the selected frequency difference to amplify signals at that frequency.

2. In a system for detecting objects disposed in an energy propagational medium, transmission means for delivering frequency modulated signals into the medium, reception means for intercepting signals in the medium reflected from objects located in the medium, storage means retaining for a period of time first signals characteristic of the delivered signals and second signals characteristic of the intercepted return signals, playback control means connected to the storage means operative to control the playback of the first and second signals in variable time relationship to secure a selected frequency difference beneath the played back first signals and the played back second signals for selected range, a mixer responsive to the reproduced signals operative to produce difference frequency signals, and a narrow bandwidth intermediate frequency amplifier responsive to the selected frequency difference to selectively amplify signals at that frequency.

3. In a system for detecting objects disposed in an energy propagational medium, transmission means for delivering frequency modulated signals into the medium, reception means for intercepting signals reflected from objects, storage means retaining for a period of time first signals characteristic of the delivered signals and second signals characteristic of the intercepted return signals, playback control means connected to the storage means operative to control the playback of the first and second signals in variable time relationship to secure a selected frequency difference between the played back first signals and the played back second signals for a selected range, means for mixing said played back signals to obtain signals of said selected frequency difference, a narrow bandwidth intermediate frequency amplifier coupled to said mixing means and responsive to signals of the selected frequency difference to amplify signals at that frequency, and utilization means connected to the output of the intermediate frequency amplifier.

4. In a system for detecting objects disposed in an energy propagational medium, transmission means for delivering ferquency modulated signals into the medium, reception means for intercepting signals in the midium as reflected from objects located in the medium, storage means retaining for a period of time first signals characteristic of the delivered signals and second signals characteristic of the intercepted return signals, first playback control means operative to control the repetitive playback of stored first signals, second playback control means operative to control the repetitive playback of stored second signals with variable time relationship to the played back first signals dependent upon the selected range of operation, mixing means combining the played back first signals played back second signals to obtain difference frequency signals, and a narrow bandwidth intermediate frequency amplifier responsive to difference frequency signals of a selected frequency.

5. In a system for detecting objects disposed in an energy propagational medium, transmission means for delivering frequency modulated signals into the medium, reception means for intercepting signals in the medium as reflected from objects located in the medium, first storage means for retaining for a period of time first signals characteristic of the variational characteristics of the delivered signals occurring over a time period at least equal in duration to the time delay in signal propagation to and from the medium range of operation, second storage means for retaining for a period of time second signals characteristic of the variational characteristics of reflected signals received during said time period, playback control means for controlling the repeated playback of the first and second stored signals simultaneously, means within said playback control means for altering the time relationship between the played back first signals and the played back second signals to secure correspondence between reflected signals for any predetermined range and the delivered signals producing them, mixing means for combining the played back signals to obtain beat signals, a narrow bandwidth intermediate frequency amplifier responsive to a selected beat signal frequency, and utilization means connected to the amplifier operative to utilize the signal output therefrom.

References Cited

UNITED STATES PATENTS

| | | | |
|---|---|---|---|
| 2,405,134 | 8/1946 | Brown | 340—3 |
| 2,422,135 | 6/1947 | Sanders | 343—14 X |
| 2,454,410 | 11/1948 | Snyder | 315—12 |
| 2,536,771 | 1/1951 | Rost | 340—3 |
| 2,261,272 | 11/1941 | Newhouse | 343—14 |
| 2,268,643 | 1/1942 | Crosby | 343—14 |
| 2,638,586 | 5/1953 | Guanella | 343—14 |

RICHARD A. FRALEY, *Primary Examiner.*

NORMAN H. EVANS, CHESTER L. JUSTUS,
*Examiners.*

J. R. SPALLA, P. H. BLAUSTEIN, *Assistant Examiners.*